(12) United States Patent
Thompson et al.

(10) Patent No.: US 8,903,216 B2
(45) Date of Patent: Dec. 2, 2014

(54) CABLE STRAIN RELIEF CLAMPING DEVICES AND METHODS FOR USING THE SAME

(75) Inventors: Roy Keller Thompson, Apex, NC (US); Chien-an Chen, Holly Springs, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 289 days.

(21) Appl. No.: 13/409,478

(22) Filed: Mar. 1, 2012

(65) Prior Publication Data

US 2012/0230646 A1    Sep. 13, 2012

Related U.S. Application Data

(60) Provisional application No. 61/449,872, filed on Mar. 7, 2011.

(51) Int. Cl.
| | | |
|---|---|---|
| *G02B 6/00* | (2006.01) | |
| *G02B 6/44* | (2006.01) | |
| *H02G 15/007* | (2006.01) | |
| *G02B 6/38* | (2006.01) | |

(52) U.S. Cl.
CPC ............ *G02B 6/4477* (2013.01); *G02B 6/4471* (2013.01); *H02G 15/007* (2013.01); *G02B 6/4442* (2013.01); *G02B 6/3887* (2013.01); *G02B 6/3897* (2013.01); *G02B 6/4478* (2013.01)
USPC ........... 385/136; 385/134; 385/135; 385/137; 385/138; 385/139

(58) Field of Classification Search
CPC .. G02B 6/4477; G02B 6/4442; G02B 6/4471; G02B 6/4478; G02B 6/3897; G02B 6/3887
USPC ................................................. 385/134–139
See application file for complete search history.

(56) References Cited

U.S. PATENT DOCUMENTS

| | | | |
|---|---|---|---|
| 5,048,920 A | | 9/1991 | Newell |
| 5,710,851 A | * | 1/1998 | Walter et al. ..................... 385/86 |
| 8,313,250 B2 | * | 11/2012 | Drouard .......................... 385/77 |
| 2006/0034578 A1 | * | 2/2006 | Allen et al. .................... 385/135 |
| 2006/0275006 A1 | | 12/2006 | Xin |

(Continued)

FOREIGN PATENT DOCUMENTS

| | | |
|---|---|---|
| DE | 200 12 572 U1 | 1/2001 |
| EP | 2 148 231 A1 | 1/2010 |
| WO | WO 2008/118927 A1 | 10/2008 |

OTHER PUBLICATIONS

International Search Report Corresponding to International Application No. PCT/US2012/027171; Date of Mailing: May 23, 2012; 9 Pages.

(Continued)

*Primary Examiner* — Ryan Lepisto
*Assistant Examiner* — Guy Anderson
(74) *Attorney, Agent, or Firm* — Merchant & Gould P.C.

(57) ABSTRACT

A clamping device for connecting a cable to a strain relief member includes a housing having a retention member extending therefrom. The retention member is configured to be inserted in a mating opening in the strain relief member and to be secured thereto. A connector is configured to connect the cable to the housing.

17 Claims, 10 Drawing Sheets

(56) References Cited

U.S. PATENT DOCUMENTS

| | | |
|---|---|---|
| 2007/0047897 A1 | 3/2007 | Cooke et al. |
| 2007/0274661 A1* | 11/2007 | Allen et al. .................. 385/135 |
| 2008/0170832 A1 | 7/2008 | Mullaney et al. |
| 2010/0183270 A1 | 7/2010 | Davis et al. |
| 2011/0033157 A1* | 2/2011 | Drouard .......................... 385/77 |
| 2012/0230646 A1* | 9/2012 | Thompson et al. ........... 385/135 |

OTHER PUBLICATIONS

Written Opinion of the International Preliminary Examining Authority Corresponding to International Application No. PCT/US2012/027171; Date of Mailing: Feb. 26, 2013; 5 Pages.

* cited by examiner

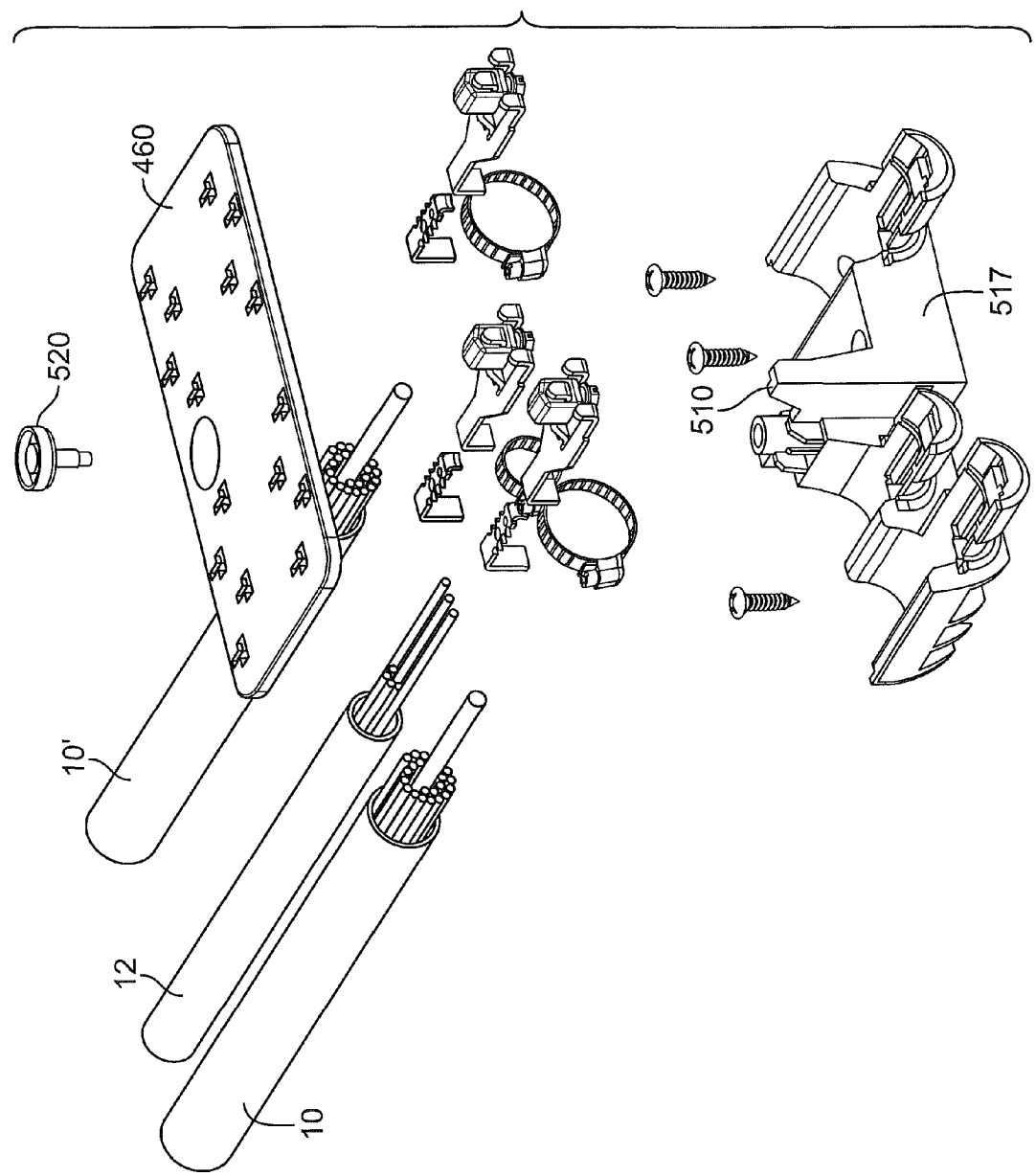

CABLE STRAIN RELIEF CLAMPING DEVICES AND METHODS FOR USING THE SAME

RELATED APPLICATION(S)

The present application claims the benefit of U.S. Provisional Patent Application No. 61/449,872, filed Mar. 7, 2011, the disclosure of which is hereby incorporated herein by reference in its entirety.

BACKGROUND OF THE INVENTION

The present invention relates to communication cable systems and, more particularly, to optical fiber clamping systems and methods for clamping optical fibers with the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of fifty feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

In addition to the optical fibers, a typical fiber optic cable may include cable jacketing material, cable strength members and fiber containment tubes. These three basic elements sometimes have different properties, such as different hardnesses, different stiffnesses, and different coefficients of thermal expansion. It may be desirable in many situations to limit or even prevent the cable jacketing and the cable strength members from axial displacement relative to one another, and/or relative to a cable enclosure or other device attached to the cable. A typical situation in which the securing is desired is where an opening has been made in the fiber optic cable for accessing the internal optical fibers, and where a splice enclosure may be installed.

In some existing systems, the securing of an accessed portion of a fiber optic cable may be achieved by first removing the cable outer jacket in order to expose some length of the strength members of the cable. The securing of the outer cable jacket is typically achieved by mechanically securing the outer cable jacket to a substrate at a location where the cable jacket is intact, i.e., outside of the region of the cable jacket that has been removed. This generally allows a circumferential clamp, such as a hose clamp or the like, to be tightened around the intact outer cable jacket, and then the clamp is attached to a substrate. In some cases, the clamp may be tightened around the full cable jacket and an extending element of the substrate so as to secure the cable outer jacket to the substrate. The cable strength element(s) are typically clamped in another clamp device, which is also attached to the substrate. This clamping may be achieved by various arrangements of screw actuated clamps and the like in order to bind down on and exert high forces upon the generally more rigid and harder strength member material. Thus, in combination, the clamping of the intact outer cable sheath to the substrate, and the clamping of the protruding exposed strength member(s) to the substrate can limit or even prevent displacement between the two, and can also serve as a means to jointly anchor the two to a device, such as a splice closure.

SUMMARY OF THE INVENTION

According to some embodiments of the present invention, a clamping device for connecting a cable to a strain relief member includes a housing having a retention member extending therefrom. The retention member is configured to be inserted in a mating opening in the strain relief member and to be secured thereto. A connector is configured to connect the cable to the housing.

In other embodiments, the retention member includes a first retention member at a first longitudinal end of the housing and a second retention member at an opposite second longitudinal end of the housing, each of which is configured to be inserted in a corresponding mating opening in the strain relief member. The retention members include "T" shaped legs extending from a bottom surface of the housing. The mating openings in the strain relief member include a wide portion configured to receive the "T" shaped legs and a narrow portion extending longitudinally from the wide portion configured to limit movement of the "T" shaped legs from the mating openings when the "T" shaped legs are slid therein.

In further embodiments, the housing includes a forward section, a rear section and a gripper receiving section therebetween. The connector includes a cable gripper including a frame configured to be received in the gripper receiving section and a pair of gripper arms extending from respective sides of the frame and defining a cable receiving slot therebetween configured to receive the cable through an open upper end of the slot and secure the cable in the slot. The cable may be a flat drop cable and the housing may include a channel extending longitudinally therethrough having a width substantially similar to a width of the drop cable. The frame may include a curved segment or teeth on the sidewalls thereof that provide a retention force to retain the cable gripper in the gripper receiving section when inserted therein.

In other embodiments, the channel includes a first section in the rear section of the housing having an open end configured to allow optical fibers from the cable to pass therethrough and a second section in the rear of the housing including a rear wall configured to limit contact of a strength member from the cable contacting the optical fibers. The clamping device may further include a wrap around connector that couples the cable to the forward section of the housing and the forward section of the housing may include a receiving groove configured to receive the wrap around connector.

In yet further embodiments, the cable is a round cable and the housing includes a longitudinally extending channel therein that is a curved channel sized to correspond to an outer diameter of the cable. The connector includes a clamping plate configured to connect a strength member in the cable to the housing at a segment of the cable with an outer jacket of the cable removed to expose the strength member and an attachment member that attaches the clamping plate to a clamping section of the housing.

In other embodiments, an enclosure for enclosing splices between optical fibers of optical fiber cables includes a housing defining a splice chamber. A main cable strain relief module in the housing is configured to receive a main cable passing into the splice chamber and to secure the main cable to the housing. A strain relief member in the closure includes a plurality of openings arranged on a surface thereof and a clamping device is mounted on the surface of the strain relief member. The clamping device includes a clamp housing having a retention member extending therefrom. The retention member is configured to be inserted in one of the openings in the strain relief member and to be secured thereto. A connector is configured to connect the cable to the housing.

In further embodiments, the strain relief member further includes a retention finger associated with the corresponding pair of the openings that limits movement of the clamping device relative to the strain relief member when the "T" shaped legs are slid into the narrow portions of the corresponding pair of openings. The strain relief member may include an access opening that provides access to the retention finger to allow movement of the clamping device relative to the strain relief member.

In other embodiments, the enclosure includes a second clamping device having a second clamp housing and a second connector. The strain relief member includes a second corresponding pair of the openings having a substantially same size and spacing therebetween as the first corresponding pair of the openings. The first clamping device is configured to secure a flat drop cable and the second clamping device is configured to secure a round cable.

In yet further embodiments, a kit for securing cables to an enclosure includes a strain relief plate including a plurality of openings arranged on a surface thereof. The kit further includes a first clamping device including a first housing having a retention member extending therefrom. The retention member is configured to be inserted in one of the openings in the strain relief plate and to be secured thereto. A first connector of the first clamping device is configured to connect the cable to the first housing. The kit further includes a second clamping device. The second clamping device includes a second housing having a retention member extending therefrom. The retention member is configured to be inserted in one of the openings in the strain relief plate and to be secured thereto. The second clamping device further includes a second connector configured to connect the cable to the first housing. The first clamping device is configured to clamp a flat drop cable and the second clamping device is configured to clamp a round cable. The strain relief plate may be configured to be removably mounted in an enclosure for enclosing splices between optical fibers of optical fiber cables.

In other embodiments, a method of coupling a cable to an enclosure includes attaching the cable to a housing of a clamping device, the housing having a retention member extending therefrom. The retention member is configured to be inserted in a mating opening in a strain relief member and to be secured thereto. The retention member is then inserted into the mating opening of the stain relief plate with the cable attached thereto to attach the clamping device to the strain relief plate. The strain relief plate is configured to be attached to the enclosure.

BRIEF DESCRIPTION OF THE DRAWINGS

The accompanying drawings, which are incorporated in and constitute a part of the specification, illustrate some embodiments of the invention and, together with the description, serve to explain principles of the invention.

FIG. 5B is an exploded perspective view of the main cable strain relief with the strain relief plate attached thereto of FIG. 5A.

DETAILED DESCRIPTION OF EMBODIMENTS OF THE INVENTION

Figure 1A:
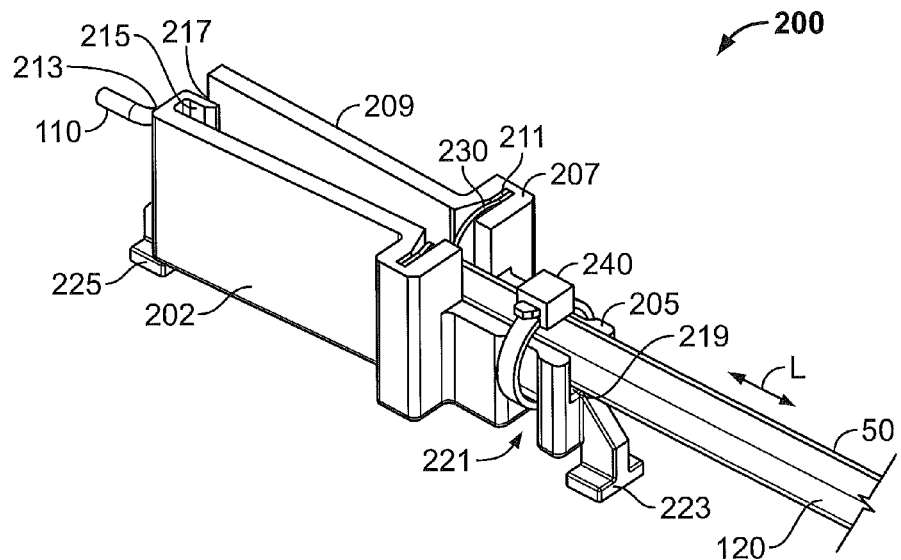
FIG. 1A is a perspective view of a clamping device for a fiber optic cable according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Like numbers refer to like elements throughout the description.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The description below references enclosing a portion of a fiber optic cable to a closure device and securing the closure device with respect to the cable portion. The referenced fiber optic cables may include multiple optical fiber ribbons, a buffer tube, strength members, a jacket and a metal shield layer; however, according to other embodiments, fiber optic cables of other constructions (e.g., a fiber optic cable not having a metal shield layer) may be used with embodiments of the present invention.

As will be described further herein, some embodiments of the present invention provide devices configured to secure a plurality of fiber optic cables to each other and then secure all of the so connected cables to a substrate such as a splice housing. In some embodiments of the present invention, a clamping device is provided that is configured to allow a cable installer to attach cable strain relief components to the cable outside of the closure to which the cables will be secured. Such an initial securing may, therefore, be accomplished in a setting where there is generally more access, making the attachment easier to perform. The pre-secured cable(s) may then be moved proximate to the closure and attached to the closure, thereby providing the desired cable strain relief. As will be further illustrated herein, in some embodiments, the cable attachments for pre-securing the cables can come in a variety of styles and sizes to accommodate a range of different cable styles and sizes. Such a modular approach may allow varying styles and sizes of cable to be terminated at a closure on a same strain relief plate. In some embodiments as described further herein, the strain relief module/cable may be attached to the strain relief plate by means of a sliding "T" joint with a flexible latch to secure the connection to the plate. In some embodiments, the flexible latch can be depressed, for example, with the use of a tool, to release the cable from the strain relief plate. Such securing operations of cables and subsequently to a cable splice enclosure can be accomplished by many different embodiments of the clamping device as will be further described below.

Some embodiments of the present invention are applicable to multiple cable types and multiple specific methods by which the cable jackets and strength members are retained. Using some embodiments of the present invention facilitates making the strain relief termination of capturing the strength members of the cable and cable jacket to the modular strain relief device easier to accomplish in free space rather than constrained inside the closure. The modular strain relief device can be designed specifically for cables sizes and styles, which may make the task of attaching to the cable jacket and strength members easier and more efficient.

Figure 1B:
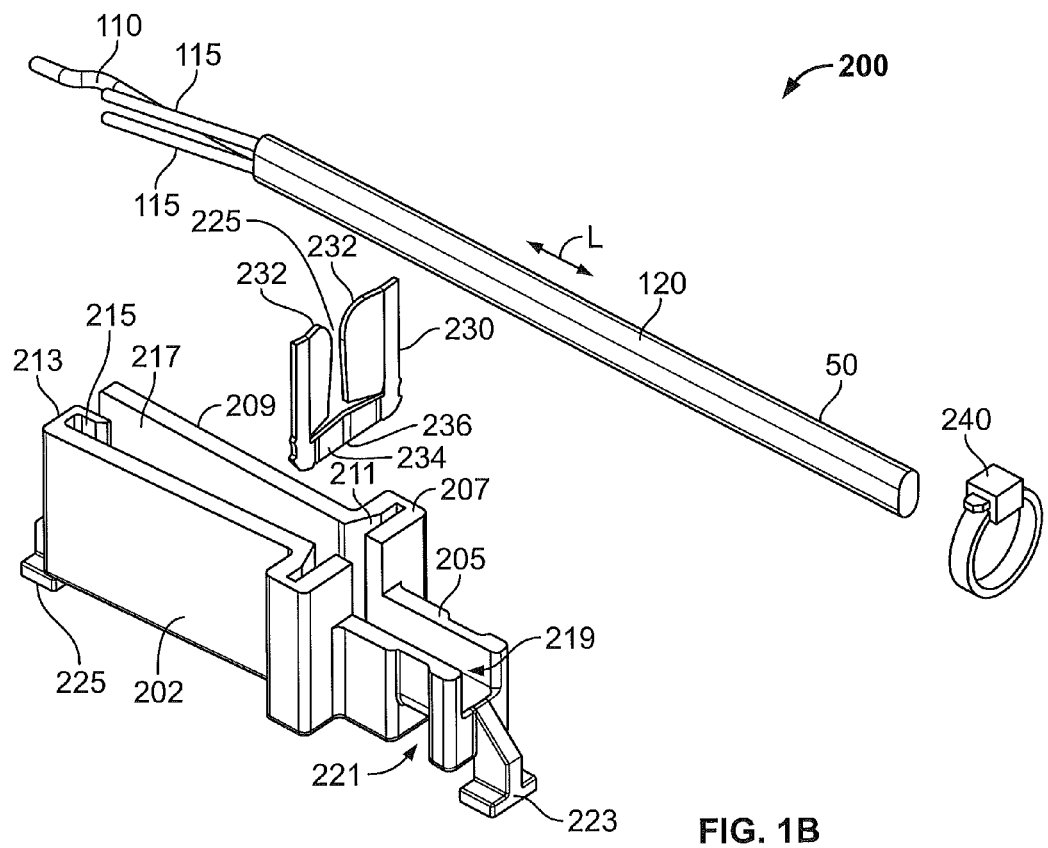
FIG. 1B is an exploded perspective view of the clamping device of FIG. 1A.

Some embodiments of a clamping device 200 for a fiber optic cable 50 will now be further described with reference to the perspective views of FIGS. 1A and 1C and the exploded perspective view of FIG. 1B. As seen in FIGS. 1A and 1B, the cable 50 has a lengthwise (longitudinal) cable axis L and includes a plurality of optical fibers 110 (shown in the figures as contained in a buffer tube), a pair of strength members 115 and a jacket 120 surrounding the optical fibers 110.

For purposes of this discussion, the terms longitudinal and lengthwise are used interchangeably to refer to a direction along the cable axis L while the term transverse is used to refer to a plane as seen in the cross-sectional view of FIG. 1B, which transverse direction is defined by a plane relative to the cable axis L that is substantially transverse to a plane that the cable axis L extends along. Finally, references to "forward" as used herein refers to the right side as seen in FIG. 1A while "rear" or "back" refers to the left side as shown in FIG. 1A, where a closure will generally be located. It will also be understood that the portions of the cable 50, in practice, will generally be cut so as to provide an access opening to the cables 110. As illustrated herein, all of the features of the cable 50 appear cut. However, it will be understood that this is for illustrative purposes as the optical fiber and/or buffer tube including optical fibers may be cut for splicing in the closure or may be uncut through fibers. Furthermore, while the entire jacket 120 is shown as removed to provide the opening, in some embodiments, portions of the jacket 120 remain while sufficient amounts of the jacket 120 are removed to allow access to the fiber(s) 1110 and strength member(s) 115. One or more splices may be formed between the cable(s) 110 and other cables or the like.

Referring now to FIGS. 1A and 1B, the clamping device 200 includes a housing 202 and a cable gripper 230 The "T" shaped housing 202 includes a forward section 205, a rear section 209 and a gripper receiving section 211 therebetween that defines the "T" shape of the housing 200. The rear section 209 includes a longitudinally extending channel therein having a longitudinally extending first section 215 and a longitudinally extending second section 217 adjacent the first section 215. At a rear wall 213 of the rear section 209, the first section 215 ends at a hook shaped closed wall while the second section 217 ends at an opening in the rear wall 213. In some embodiments, when the cable 50 is received in the housing 202 with the optical fiber(s) 110 and the strength member(s) 115 exposed, the optical fiber(s) 110 continue to extend from the rear section 209 through the opening in the rear wall 213 at the end of the second section 217. In some embodiments, the strength member(s) may be cut to a selected length so as to terminate with a cut end thereof positioned in the hook shaped closed wall portion of the rear wall 213. Such an orientation may limit contact of the strength member(s) 115 with the optical fiber(s) 110 in the rear section 209 to reduce the risk of damage to the optical fiber(s) 110.

The forward section 205 includes a longitudinally extending channel 219 configured to receive a segment of the cable 50 where the cable jacket 120 is still intact. Note that, as illustrated in FIGS. 1A and 1B, cable 50 is a flat drop cable. As such, the channel 219 includes substantially flat sidewalls displaced from each other transversely a distance allowing insertion of the cable 50 therebetween. In some embodiments, a transverse width of the channel may be slightly less than that of the cable 50 to allow an interference fit that may serve to hold the cable 50 in place until it is secured in place by, for example, a tie-wrap 240 or other connector. In other embodiments, the channel width may be slightly more that of the cable 50, using other features to retain the cable without use of an interference fit. The forward section 205 in the illustrated embodiments also includes a connector receiving groove 221 configured to receive the tie wrap 240 to secure the cable 50 in the clamping device 200.

The gripper receiving section 211 illustrated in FIGS. 1A and 1B includes a transverse slot 211 configured to receive the cable gripper 230 therein. As seen in FIGS. 1B and 1D, the cable gripper 230 has two gripper arms 232 and a frame 234. The gripper arms 232 extend towards each other from the sides of the frame 234 at an angle a. A gap between the gripper arms 232 in the center of the cable gripper 230 defines a cable receiving slot 225. For the illustrated embodiments, the gripper arms 232 are angled toward the rear end of the housing 202 when inserted into the slot 211. As such, with the cable 50 inserted therein, they are especially resistant to pulling of the cable longitudinally towards the front end. In other words, when installed in a closure, if an operator were to inadvertently try to pull the cable 50 out of the closure, the gripper arms 232 would flex to increase the gripping force applied to the cable 50 and prevent movement thereof. The slot 211 includes corresponding angled wall segments to allow the cable gripper 230 to be inserted therein.

Also seen in the illustrated embodiments is a curved segment 236 on a bottom arm of the frame 234. The gripper arm 230 may be a metal material, such as spring steel, and when the gripper arm 230 is inserted in the slot 211 and interference fit with the slot 211 may flex the curved segment 236. As a result, a retention force may be applied between the slot 211 and the frame 234 to help with secure retention of the gripper arm 230 in the slot 211. Furthermore, teeth are shown on the bottom of the sides of the frame 234, which teeth may also act to retain the gripper arm 230 in the slot 211.

Figure 1C:
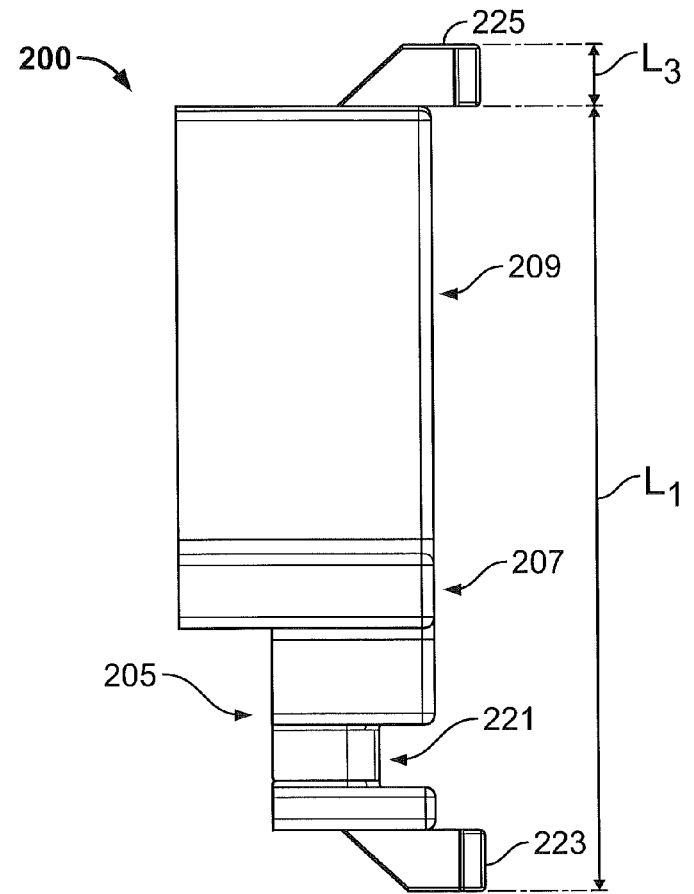
FIG. 1C is a side view of the housing of the clamping device of FIG. 1.
Figure 1D:
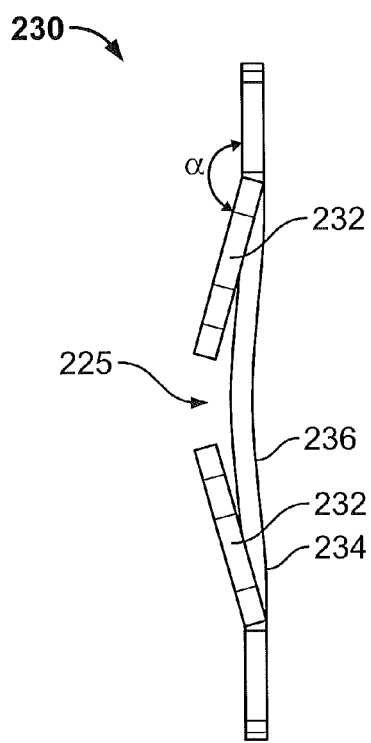
FIG. 1D is a top view of the gripper arm of the clamping device of FIG. 1.

Also seen in FIGS. 1A to 1C are a forward retention leg 223 and a rear retention leg 225 of the housing 202. These "T" shaped legs may be used to grip the clamping device 200 as will be further described with reference to FIGS. 3A and 3B.

Figure 2A:
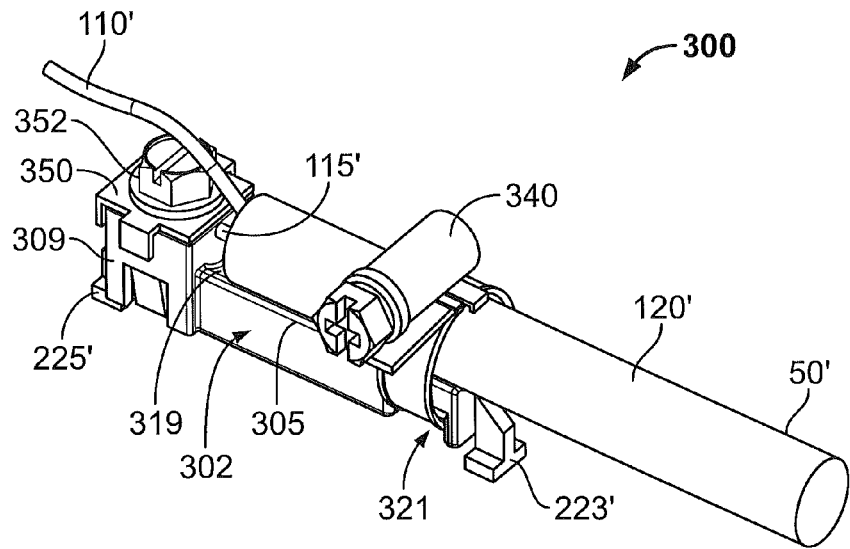
FIG. 2A is a perspective view of a clamping device for a fiber optic cable according to further embodiments of the present invention.
Figure 2B:
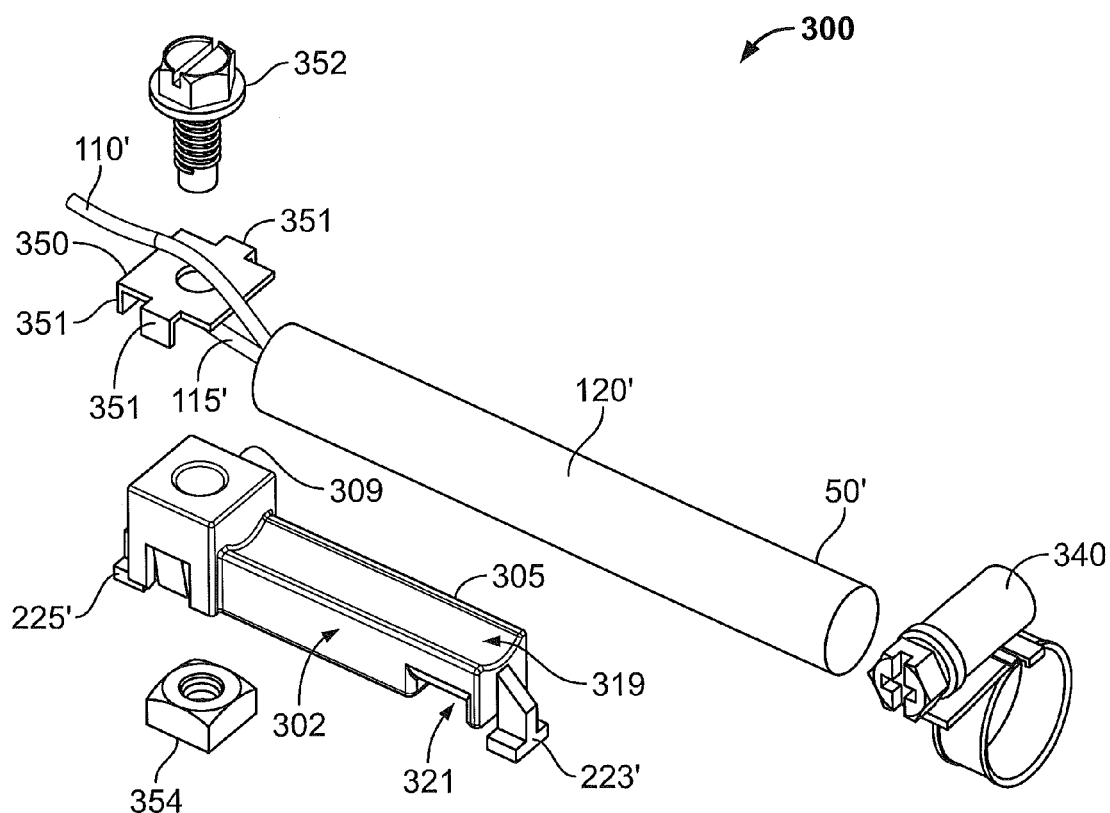
FIG. 2B is an exploded perspective view of the clamping device of FIG. 2A.

Further embodiments of clamping devices will now be described with reference to FIGS. 2A and 2B. As seen in FIGS. 2A and 2B, a clamping device 300 includes a housing 302 and a clamping plate 350, a connector, shown as a bolt 352 and nut 354. Also shown in FIGS. 2A and 2B is a cable clamp 340 for securing the cable 50' to the housing 302. It will be understood that a tie wrap 240 could also be used. Similarly, a cable clamp 340 could have been used instead of a tie wrap in the previously described embodiments. It will be more generally understood that the clamping device 300 differs from the clamping device 200 in that it is configured to receive a different type of cable. The cable 50' is a round cable with an outer protective cable jacket 120' and optical fiber(s) 110', which may be in a buffer tube, and strength member(s) 115', only one of which is present in the illustrated embodiments, extending therein.

The housing 302 includes a forward section 305 and a rear section 309. The forward section 305 includes a longitudinally extending channel 319 configured to receive a segment of the cable 50' where the cable jacket 120' is intact. The curvature of the channel 319 may substantially match that of a cable type it is configured to receive. The forward section 305 also includes a connector receiving groove 321 configured to receive the cable clamp 340 to secure the cable 50' in the clamping device 300.

The rear section 309 includes an upper surface configured to mate with the clamping plate 350 to secure the strength member(s) 115' therebetween. The clamping plate 350 may be a metal plate and the housing 302 may be plastic. In some embodiments, the upper surface of the rear section 309 may be metal if a metal to metal clamp on the strength member(s) 115' is desired. The bolt 352 passes through a central opening in the clamping plate and a central opening in the rear section 309 and is secured with the nut 354 positioned on the bottom surface of the rear section 309 to secure the clamping plate 350 to the rear section 309. The rear section 309 may include a recess on the bottom surface thereof configured to receive the nut 354 and limit rotation thereof during assembly to allow attachment of the bolt 352 to the nut 354.

The clamping plate 350 seen in FIGS. 2A and 2B includes downwardly extending fingers 351 on three sides thereof. These fingers 351 facilitate alignment of the clamping plate 350 on the upper surface of the rear section 309 and further limit rotation thereof during rotation of the bolt 352 to secure the clamping plate 350 to the rear section 309. In addition, the rear (back) finger 351 may act as a stop member limiting advancement of the strength member(s) 115' into the closure. As such, the illustrated rear finger 351 may be wider than the side fingers 351, and may extend the full width of the underlying rear section 309. No finger is shown on the fourth side, which receives the strength member(s) 115', which may allow easier insertion of the strength member(s) 115' between the rear section 309 and the clamping plate 350.

Also shown in FIGS. 2A and 2B are a forward retention leg 223' and a rear retention leg 225' of the housing 302. In some embodiments, the retention legs 223', 225' are substantially identical to the retention legs 223, 225 with a substantially identical spacing therebetween to allow the respective clamping devices 200, 300 to be interchangeably mounted in respective stations on a strain relief plate as will be described with reference to FIGS. 3A to 3C. In other words, referring to FIG. 1C and FIG. 3B, A length $1_1$ between legs 223 and 225 and between legs 223', 225' may be substantially the same and match a length $1_2$ between openings 466, 468 that will be described below. Similarly, a length $1_3$ of all of the legs 223, 225, 223', 225' may match a length $1_4$ of a narrow portion 472 of openings 466, 468 that will be described below.

Figure 3A:
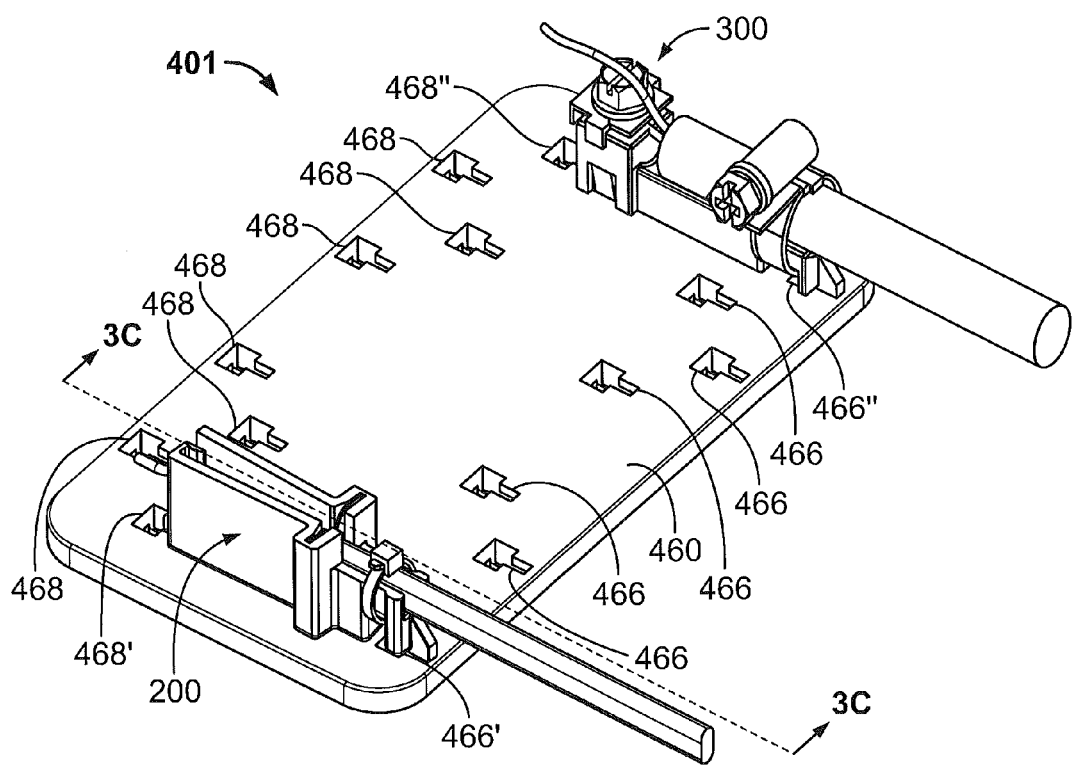
FIG. 3A is a perspective view of a clamping device assembly for a fiber optic cable according to some embodiments of the present invention.
Figure 3B:
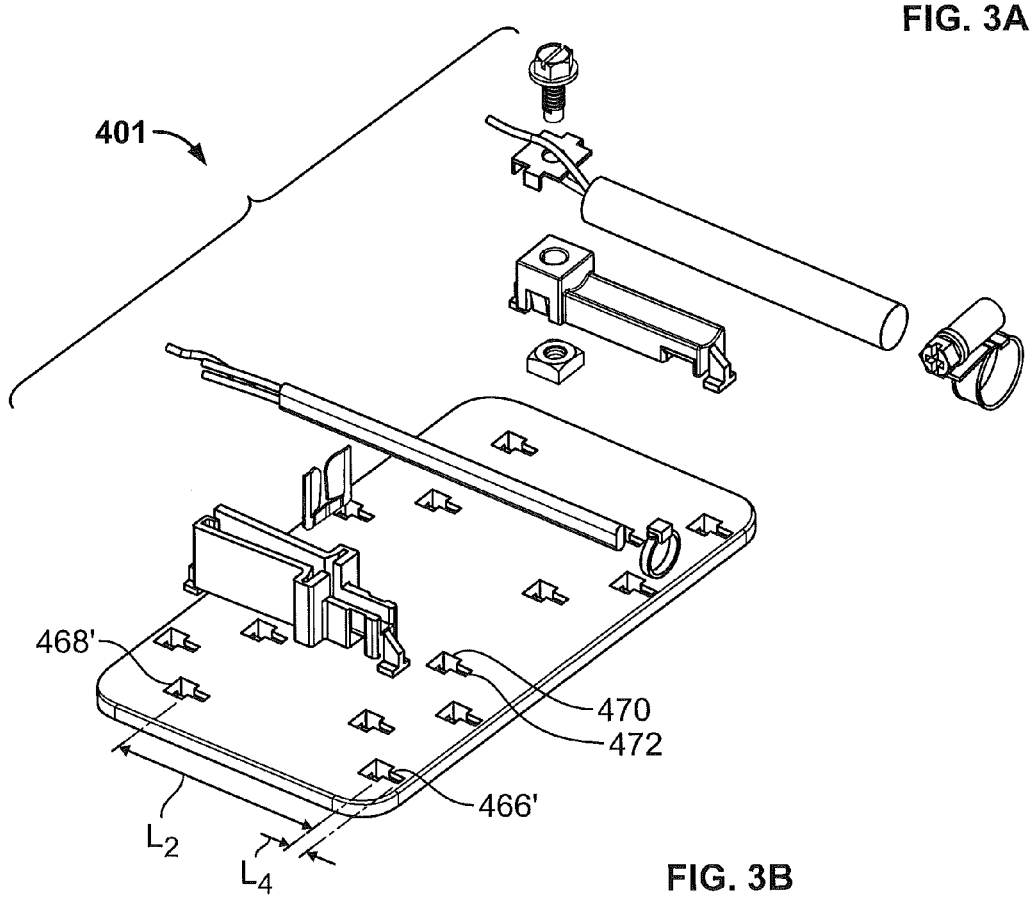
FIG. 3B is an exploded perspective view of the clamping device assembly of FIG. 3A.
Figure 3C:
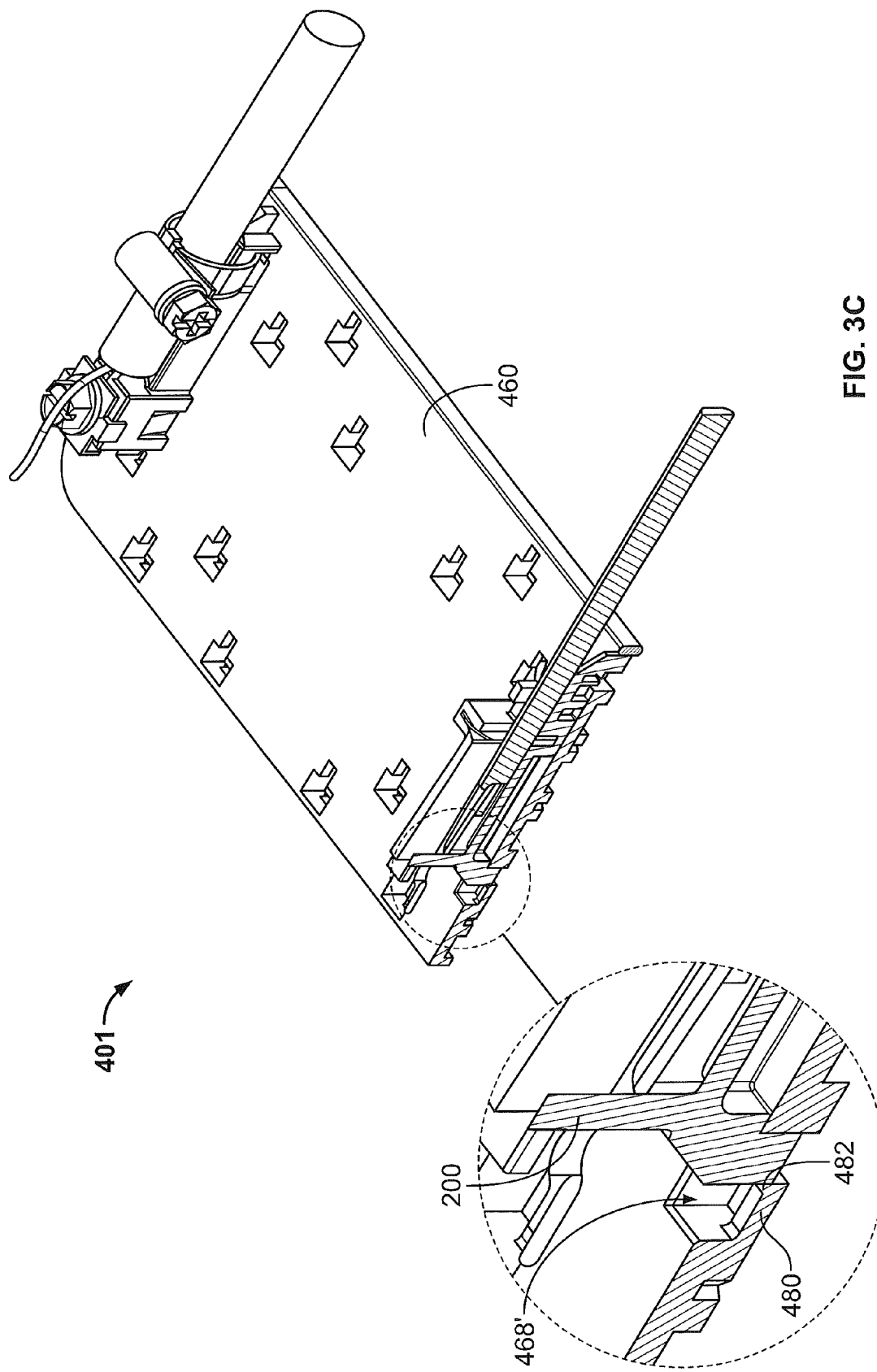
FIG. 3C is an exploded perspective view of the clamping device assembly of FIG. 3A.

Referring now to FIGS. 3A to 3C, a clamping device assembly 401 according to some embodiments of the present invention will now be described. The clamping device assembly includes a strain relief plate 460 with a plurality of clamping devices 200, 300 secured thereto. The clamping devices 200, 300 have been described above and the features thereof will now only be further discussed as they relate to the strain relief plate 460.

The strain relief plate includes a plurality of forward leg receiving openings 466 and a corresponding plurality of rear leg receiving openings 468. For the illustrated embodiments, eight aligned pairs of the openings 466, 468 are illustrated, which define eight separate clamping device mounting stations on the strain relief plate 460. In other words, eight clamping devices may be mounted to the strain relief plate 460, although only two are shown attached thereto in the figures. The clamping device 200 is mounted in a first station using openings 466' and 468'. The clamping device 300 is mounted in the eighth station using openings 466" and 468".

Each of the openings 466, 468 includes a wide portion 470 and a narrow portion 472 extending in a forward longitudinal direction from the wide portion 470. The "T" shaped wider portion of the legs 223, 225 has a size corresponding the wide portion 470 to allow the legs 223, 225 to pass through their respective forward opening 466 and rear opening 468. The clamping devices 200, 300 are then moved in a forward direction and the narrower portion of the "T" shape passes through the narrow portion 472 of the openings 466, 468, in which position the "T" shaped wider portion of the legs 223, 225 is prevented from passing upwardly through the opening 466, 468 to secure the clamping devices to the strain relief plate 460.

As seen in FIG. 3C, which is a cross-sectioned perspective view taken along line 3C-3C of FIG. 1A, a retention finger 480 is provided to limit longitudinal movement of the clamping device 200, 300 after installation to maintain the clamping device 200, 300 secured to the strain relief plate 460. As seen in FIG. 3C, the retention finger 480 includes an upwardly extending tab 482 at a forward end thereof. The tab 482 may be pressed down by flexing of the retention finger 480 on insertion of the clamping device 200, 300 in the opening 466, 468 to allow insertion and forward movement of the clamping device 200, 300. Once the clamping device 200, 300 is advanced into the narrow portion 472, the retention finger 480 may be released to relax back to its un-flexed position and the tab 482 end of the retention finger 480 moves up to a position limiting rearward movement of the clamping device 200, 300. A screwdriver or other actuator may be inserted in the opening 466, 468 to flex the retention finger 480 downward to release the engagement with the clamping device 466, 468. This allows rearward movement of the clamping device 200, 300 to allow removal thereof from the strain relief plate 460.

Figure 4A:
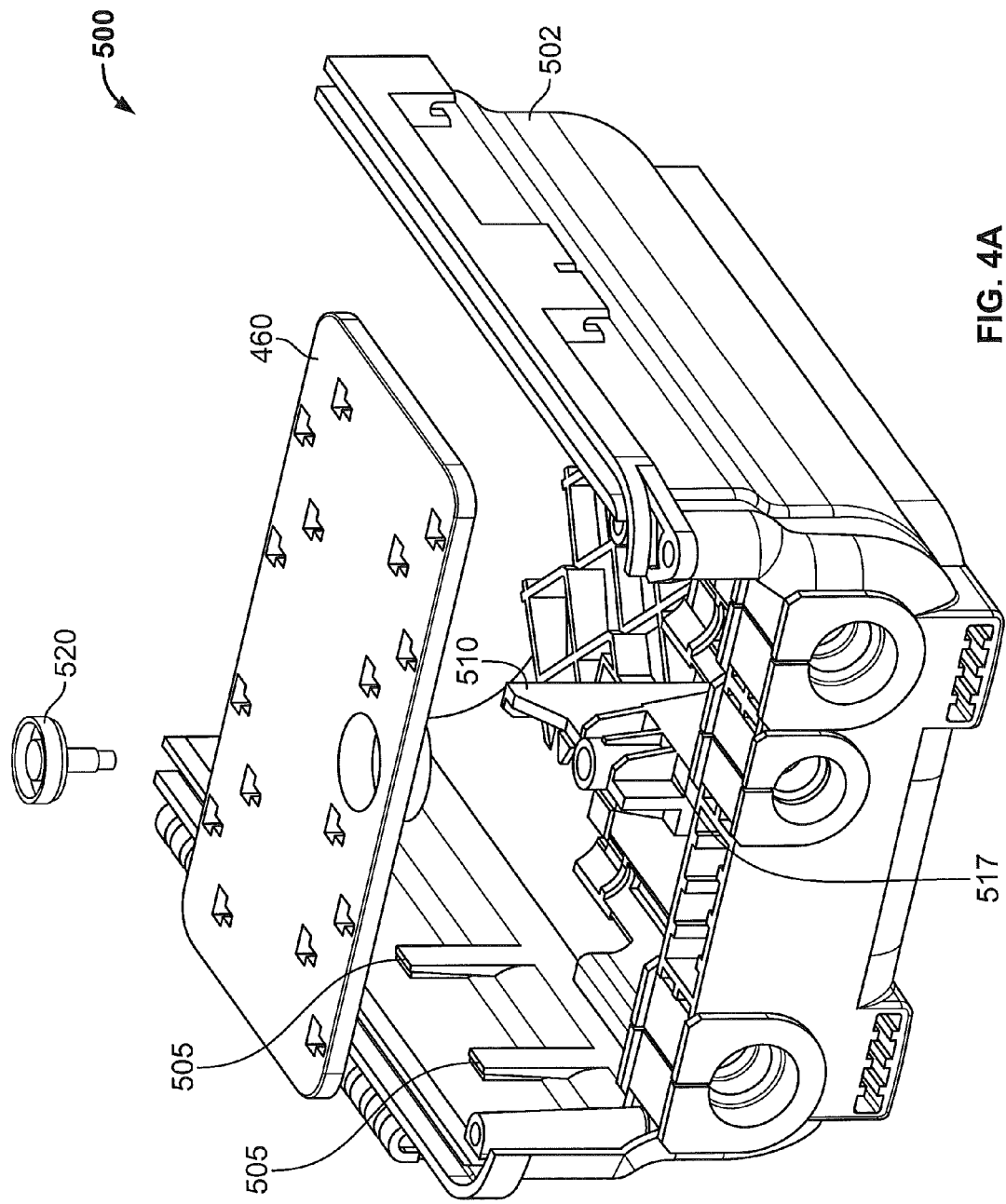
FIG. 4A is a partially exploded perspective partial view of a closure including the clamping device assembly of FIG. 3A according to some embodiments of the present invention.
Figure 4B:
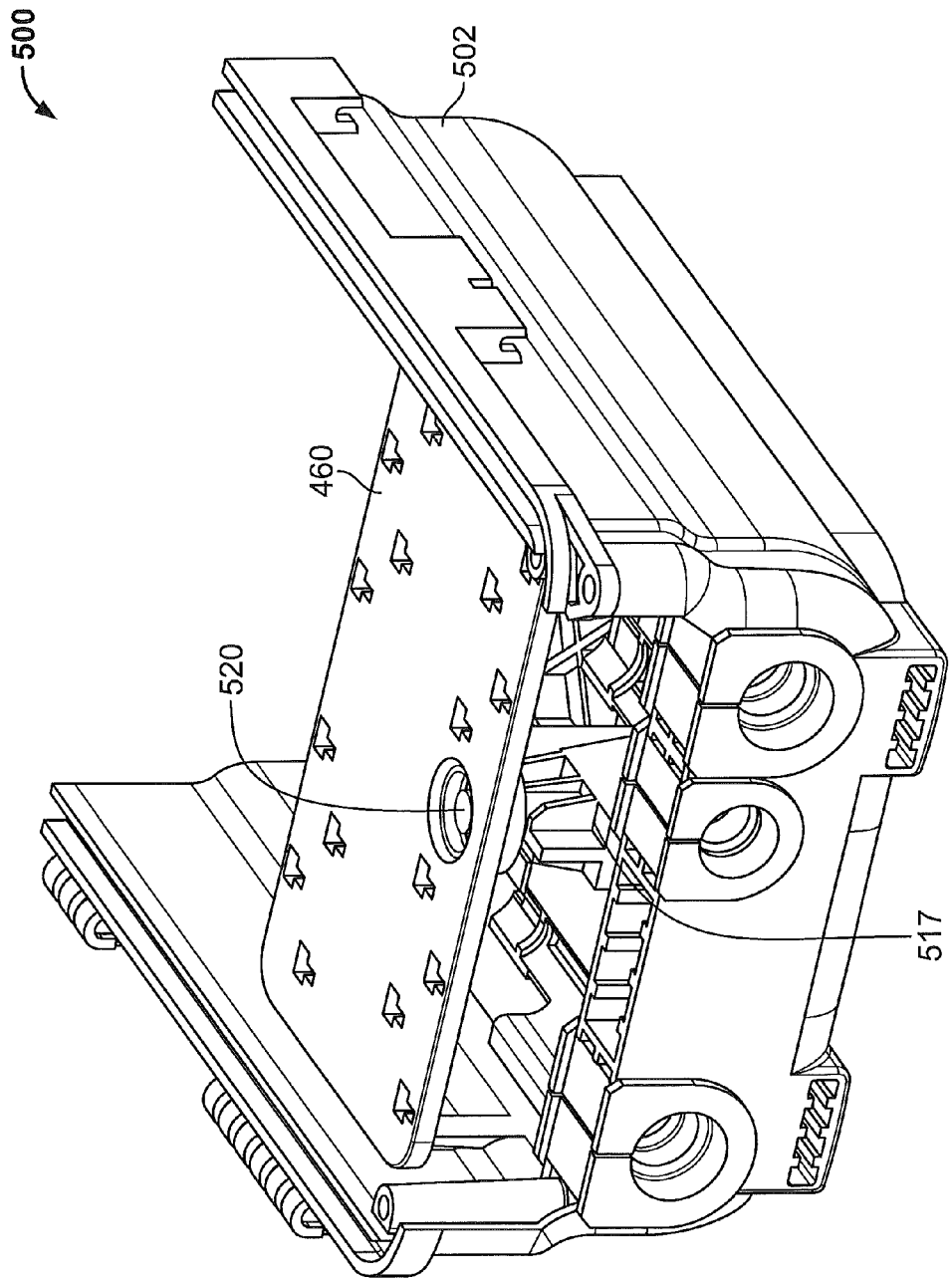
FIG. 4B is a perspective view of the closure of FIG. 4A with the strain relief plate installed in the closure.
Figure 4C:
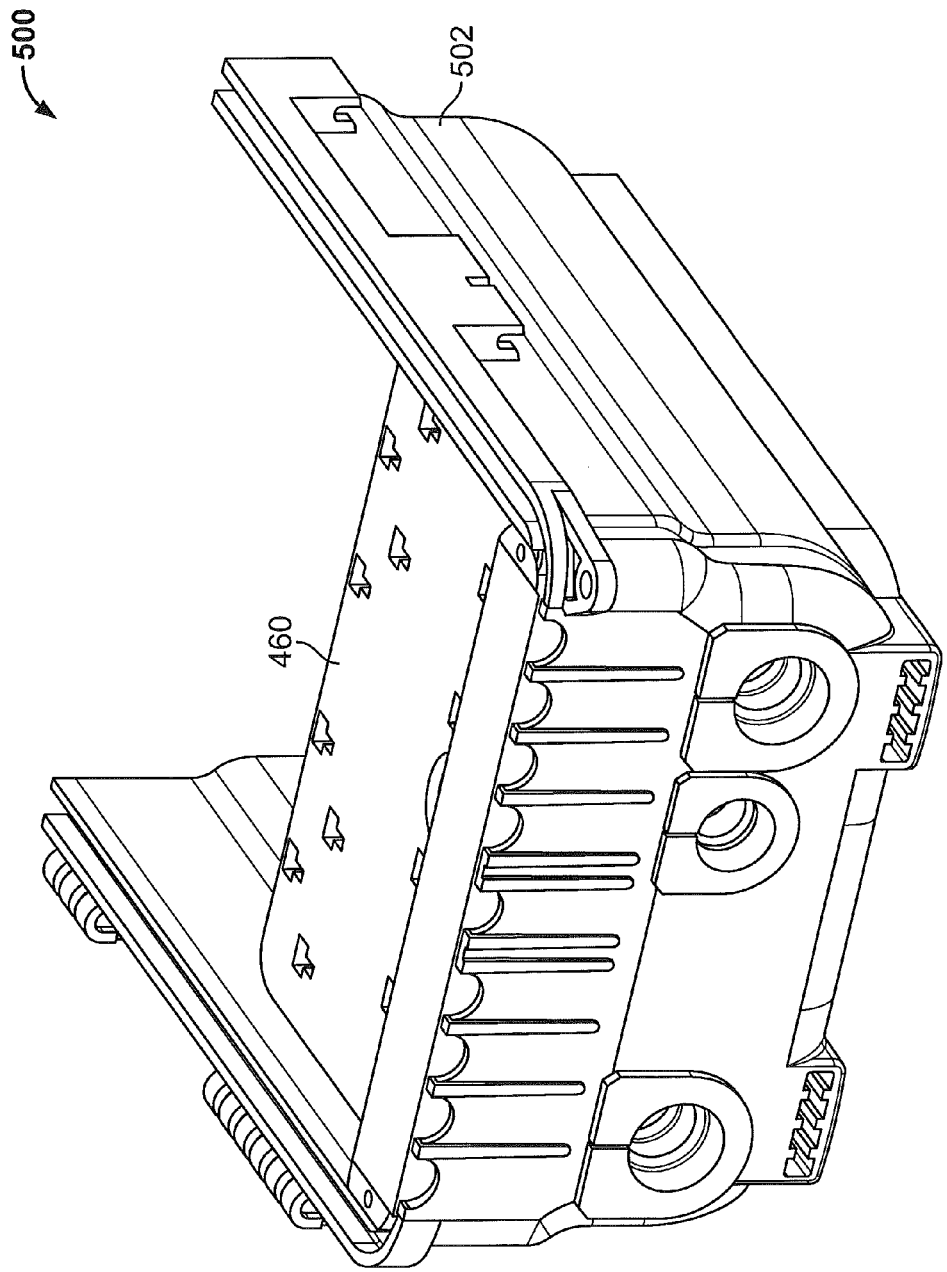
FIG. 4C is a perspective view of the closure of FIG. 4A with the strain relief plate installed in the closure and an endplate in place on the closure.

Further embodiments of the present invention will now be described with reference to FIGS. 4A to 4C and 5A and 5B. FIGS. 4A to 4C are views showing installation of the strain relief plate 460 in a splice closure 500 including a housing 502. The strain relief plate 460, with the clamping devices (not shown) thereon, rests on mounting tabs 505 on each transverse side of the closure housing 502. Note that the tabs 505 are only visible on one side in the figures but may be substantially the same on the other side. The strain relief plate 460 further rests on a central support post 510, which is part of a main cable strain relief module 517 of the closure 500 that is installed in the housing 502. Once put in position, as seen in FIGS. 4B and 4C, the strain relief plate 460 is connected to the closure 500 by a bolt 520 coupled to a corresponding bolt connection member feature also shown as a feature of the main cable strain relief module 517.

Figure 5A:
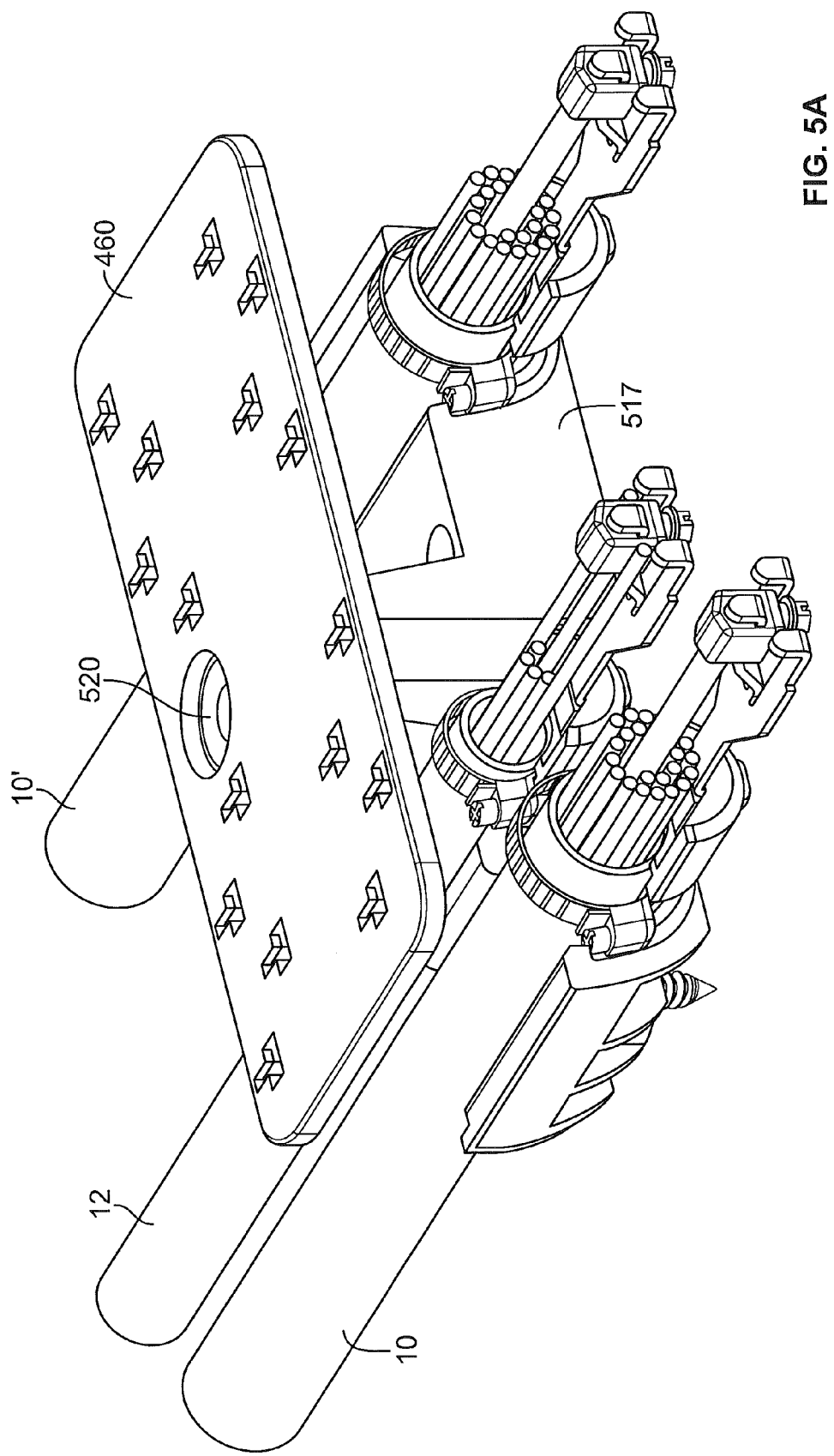
FIG. 5A is a perspective view of a main cable strain relief of the closure of FIG. 4A with the strain relief plate attached thereto according to some embodiments of the present invention.

Further details of the main cable strain relief module 517 according to some embodiments of the present invention are seen in FIGS. 5A and 5B. In particular, a main cable first section 10 and second section 10' are shown secured to the main cable strain relief module 517. The main cable 10, 10' may be an express cable that both enters and exits the closure 500 with a plurality of the fibers therein not cut. The additional cable 12 seen in the figures is also secured to the cable strain relief module 517. Cable 12 may be spliced into a plurality of cut fibers of the main cable 10, 10' to be routed, for example, along a different street than the main cable. Cable 12 may be used to provide service to customers along the different street. Additional fibers in the main cable 10, 10' may be cut and spliced to fibers in drop cables or the like secured to the strain relief plate 460. For example, such drop cables may run to customer locations located in the proximity of the closure 500. The main cable 10, 10' may be a 288 fiber count cable, the additional cable 12 may be a 72 fiber count cable and eight drop cables may be secured to the strain relief plate 460. In such embodiments, 80 fibers of the main cable 10, 10' may be cut and spliced to in the closure 500. Further note that the main cable strain relief module 517 provides separate securing features for both the outer jackets of the cables 10, 10', 12 and for strength members extending within the cables 10, 10', 12.

It will be appreciated that enclosures in accordance with the present invention may have components (e.g., cover members, walls, etc.) and cavities or chambers having shapes, configurations and/or sizes different than those shown and described herein.

Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A clamping device for connecting a cable to a strain relief member, comprising:
   a housing having a retention member extending therefrom, the retention member being configured to be inserted in a mating opening in the strain relief member and to be secured thereto; and
   a connector configured to connect the cable to the housing, wherein the retention member comprises a first retention member at a first longitudinal end of the housing and a second retention member at an opposite second longitudinal end of the housing, each of which is configured to be inserted in a corresponding mating opening in the strain relief member and wherein the retention members comprise "T" shaped legs extending from a bottom surface of the housing and wherein the mating openings in the strain relief member comprise a wide portion configured to receive the "T" shaped legs and a narrow portion extending longitudinally from the wide portion configured to limit movement of the "T" shaped legs from the mating openings when the "T" shaped legs are slid therein.

2. A clamping device for connecting a cable to a strain relief member, comprising:
   a housing having a retention member extending therefrom, the retention member being configured to be inserted in a mating opening in the strain relief member and to be secured thereto; and
   a connector configured to connect the cable to the housing, wherein the housing includes a forward section, a rear section and a gripper receiving section therebetween and wherein the connector comprises a cable gripper including:
      a frame configured to be received in the gripper receiving section; and
      a pair of gripper arms extending from respective sides of the frame and defining a cable receiving slot therebetween configured to receive the cable through an open upper end of the slot and secure the cable in the slot.

3. The clamping device of claim 2, wherein the cable comprises a flat drop cable and wherein the housing includes a channel extending longitudinally therethrough having a width substantially similar to a width of the drop cable and wherein the frame includes a curved segment or teeth on the sidewalls thereof that provide a retention force to retain the cable gripper in the gripper receiving section when inserted therein.

4. The clamping device of claim 3, wherein the channel includes a first section in the rear section of the housing having an open end configured to allow optical fibers from the cable to pass therethrough and a second section in the rear of the housing including a rear wall configured to limit contact of a strength member from the cable contacting the optical fibers.

5. The clamping device of claim 4, further comprising a wrap around connector that couples the cable to the forward section of the housing and wherein the forward section of the housing includes a receiving groove configured to receive the wrap around connector.

6. A clamping device for connecting a cable to a strain relief member, comprising:
 a housing having a retention member extending therefrom, the retention member being configured to be inserted in a mating opening in the strain relief member and to be secured thereto; and
 a connector configured to connect the cable to the housing, wherein the cable comprises a round cable and wherein the housing includes a longitudinally extending channel therein, wherein the channel is a curved channel sized to correspond to an outer diameter of the cable and wherein the connector comprises a clamping plate configured to connect a strength member in the cable to the housing at a segment of the cable with an outer jacket of the cable removed to expose the strength member and an attachment member that attaches the clamping plate to a clamping section of the housing.

7. An enclosure including the clamping device of claim 1 and further comprising:
 a splice closure housing; and
 the strain relief member in the splice closure.

8. An enclosure for enclosing splices between optical fibers of optical fiber cables, comprising:
 a housing defining a splice chamber;
 a main cable strain relief module in the housing that is configured to receive a main cable passing into the splice chamber and to secure the main cable to the housing;
 a strain relief member in the closure including a plurality of openings arranged on a surface thereof; and
 a clamping device mounted on the surface of the strain relief member, the clamping device including:
 a clamp housing having a retention member extending therefrom, the retention member being configured to be inserted in one of the openings in the strain relief member and to be secured thereto; and
 a connector configured to connect the cable to the housing, wherein the retention member comprises a first retention member at a first longitudinal end of the housing and a second retention member at an opposite second longitudinal end of the housing, each of which is configured to be inserted in a corresponding pair of the openings in the strain relief member and wherein the retention members comprise "T" shaped legs extending from a bottom surface of the clamp housing and wherein each of the openings in the strain relief member comprises a wide portion configured to receive the "T" shaped legs and a narrow portion extending longitudinally from the wide portion configured to limit movement of the "T" shaped legs from the openings when the "T" shaped legs are slid therein.

9. The enclosure of claim 8, wherein the strain relief member further comprises a retention finger associated with the corresponding pair of the openings that limits movement of the clamping device relative to the strain relief member when the "T" shaped legs are slid into the narrow portions of the corresponding pair of openings.

10. The enclosure of claim 9, wherein the strain relief member includes an access opening that provides access to the retention finger to allow movement of the clamping device relative to the strain relief member.

11. The enclosure of claim 8, wherein the clamping device comprises a first clamping device, the clamp housing comprises a first clamp housing and the connector comprises a first connector, the enclosure comprises a second clamping device having a second clamp housing and a second connector and wherein the strain relief member includes a second corresponding pair of the openings having a substantially same size and spacing therebetween as the first corresponding pair of the openings and wherein the first clamping device is configured to secure a flat drop cable and the second clamping device is configured to secure a round cable.

12. The enclosure of claim 11, wherein the first clamp housing includes a forward section, a rear section and a gripper receiving section therebetween and wherein the first connector comprises a cable gripper including:
 a frame configured to be received in the gripper receiving section; and
 a pair of gripper arms extending from respective sides of the frame and defining a cable receiving slot therebetween configured to receive the cable through an open upper end of the slot and secure the cable in the slot,
 and wherein the first clamp housing includes a channel extending longitudinally therethrough having a width selected to provide an interference fit with the flat drop cable when the cable is received therein and wherein the frame includes a curved segment or teeth on the sidewalls thereof that provide a retention force to retain the cable gripper in the gripper receiving section when inserted therein.

13. The enclosure of claim 12, wherein the second housing includes a longitudinally extending channel therein and wherein the channel is a curved channel sized to correspond to an outer diameter of the round cable and wherein the second connector comprises a clamping plate configured to connect a strength member in the flat drop cable to the second housing at a segment of the cable with an outer jacket of the cable removed to expose the strength member and an attachment member that attaches the clamping plate to a clamping section of the housing.

14. The enclosure of claim 13, wherein the first and second clamping device each further comprise a wrap around connector that couple cables therein to their respective housings and corresponding receiving grooves in their respective housings.

15. A kit for securing cables to an enclosure, comprising:
 a strain relief plate including a plurality of openings arranged on a surface thereof;
 a first clamping device including a first housing having a retention member extending therefrom, the retention member being configured to be inserted in one of the openings in the strain relief plate and to be secured thereto and a first connector configured to connect the cable to the first housing; and a second clamping device including a second housing having a retention member extending therefrom, the retention member being configured to be inserted in one of the openings in the strain relief plate and to be secured thereto and a second connector configured to connect the cable to the first housing, wherein the first clamping device is configured to clamp a flat drop cable and the second clamping device is configured to clamp a round cable.

16. The kit of claim 15, wherein the first housing includes a forward section, a rear section and a gripper receiving section therebetween and wherein the first connector comprises a cable gripper including:

a frame configured to be received in the gripper receiving section; and a pair of gripper arms extending from respective sides of the frame and defining a cable receiving slot therebetween configured to receive the cable through an open upper end of the slot and secure the cable in the slot.

17. The kit of claim 15, wherein the strain relief plate is configured to be removably mounted in an enclosure for enclosing splices between optical fibers of optical fiber cables.

* * * * *